Figure 1:
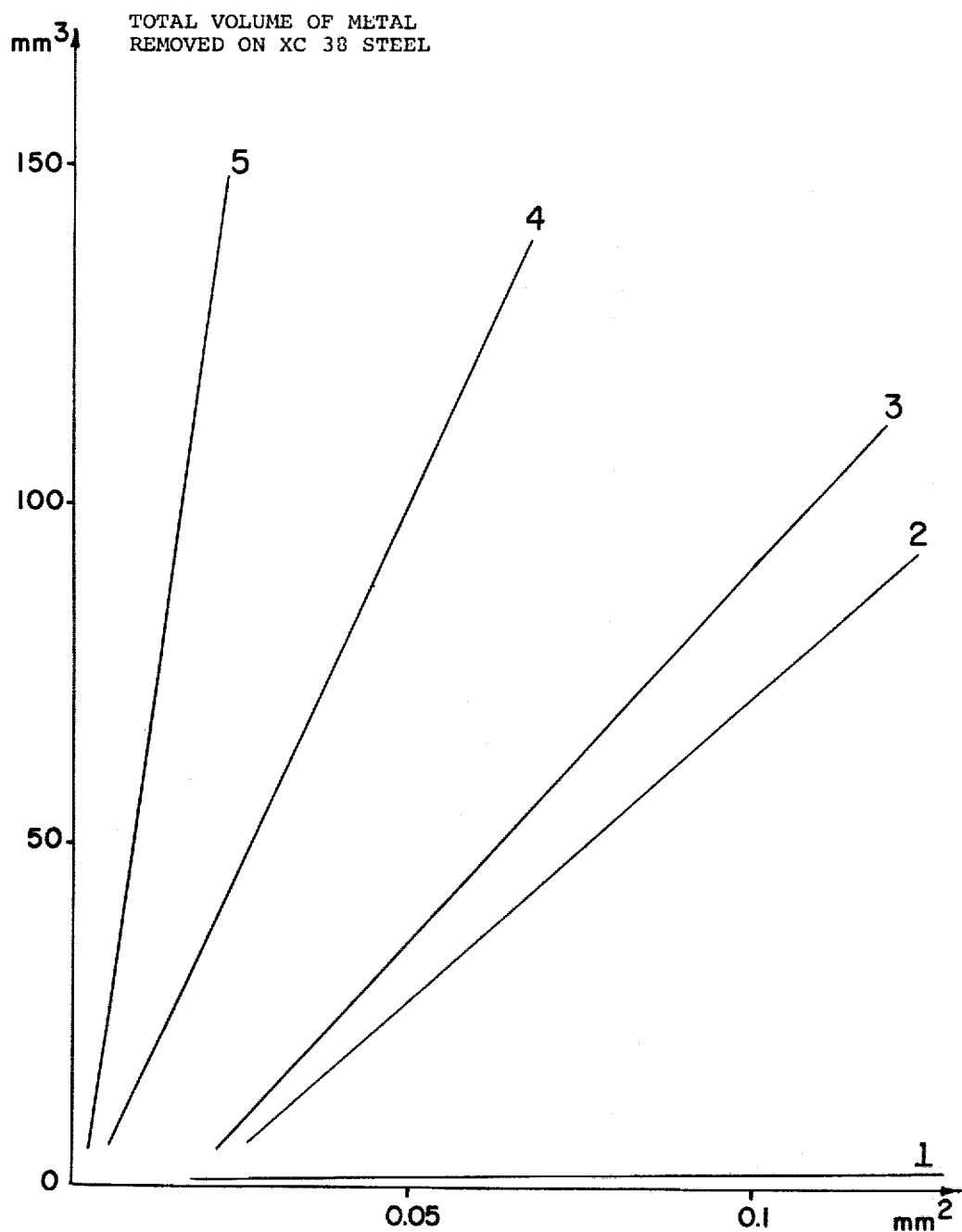

United States Patent [19]

Daire et al.

[11] 4,341,533

[45] Jul. 27, 1982

[54] HIGH-HARDNESS ABRASIVE PRODUCT BASED ON ALUMINA AND ALUMINIUM OXYCARBIDES AND PROCESS FOR PREPARING SAME

[75] Inventors: Marc Daire, Illkirsch-Graffenstaden; Yves Larrère, Strasbourg; André Mangin, Annecy, all of France

[73] Assignee: Societe Francaise D'Electrometallurgie-Sofrem, Paris, France

[21] Appl. No.: 165,686

[22] Filed: Jul. 3, 1980

[30] Foreign Application Priority Data

Jul. 5, 1979 [FR] France .............................. 79 17935

[51] Int. Cl.$^3$ ............................................. C04B 31/16
[52] U.S. Cl. ...................................... 51/309; 51/307; 501/87
[58] Field of Search .................... 51/307, 309; 106/43; 501/87

[56] References Cited

U.S. PATENT DOCUMENTS

| | | | |
|---|---|---|---|
| 3,580,708 | 5/1971 | Ogawa et al. | 51/307 |
| 3,615,307 | 10/1971 | Jones | 51/309 |
| 3,615,308 | 10/1971 | Amero | 51/307 |
| 3,792,553 | 2/1974 | Schleifer et al. | 51/309 |
| 4,059,417 | 11/1977 | Ilmaier et al. | 51/307 |
| 4,063,908 | 12/1977 | Ogawa et al. | 51/307 |

FOREIGN PATENT DOCUMENTS

1323282  7/1973  United Kingdom .

OTHER PUBLICATIONS

Journal American Ceramic Society, vol. 39, No. 1, 1956, pp. 1–11.
C. Ragon, L. Belon and H. Forestier, "Revue de Métallurgie", Paris, Jun. 1969, pp. 471–476.

*Primary Examiner*—Donald E. Czaja
*Assistant Examiner*—W. Thompson
*Attorney, Agent, or Firm*—Dennison, Meserole, Pollack & Scheiner

[57] ABSTRACT

The invention relates to a new class of high-hardness abrasive products and wear resistant parts based on alumina and aluminium oxycarbides. By fusing alumina in the presence of a carbonaceous substance and by controlled cooling, it is possible to obtain a large number of products in which the ratio $\rho$ of the number of carbon atoms to the number of carbon atoms plus oxygen atoms is between 0.01 and 0.50, and preferably between 0.02 and 0.20. These products are essentially constituted by primary alumina crystals in a eutectic matrix $Al_2O_3$ - $Al_4O_4C$ or $Al_2O_3$ - $Al_2OC$.

16 Claims, 2 Drawing Figures

Stable Equilibrium Al₂O₃–Al₄C₃

HIGH-HARDNESS ABRASIVE PRODUCT BASED ON ALUMINA AND ALUMINIUM OXYCARBIDES AND PROCESS FOR PREPARING SAME

The present invention relates to a new high-hardness abrasive product based on alumina and aluminium oxycarbides. It also relates to the process for the preparation of this product and its application in all the machining operations involving removal of material and to parts which have to resist wear.

The majority of products of high hardness, and in particular the abrasives used at present, are based either on silicon carbide or on alumina which is sintered or electrosmelted (corundum) or on mixtures of alumina and electrosmelted zirconia (zirconia corundum).

However, there are numerous cases where it would be desirable to have wear-resistant products and, in particular, abrasives which have a higher performance but which do not make use of products such as diamond or cubic boron nitride, the high price of which limits usage to quite special cases.

The applicants have found that certain crystalline compositions based on alumina and aluminium oxycarbides have a hardness and an abrasive capacity which are much better than those of corundum and of zirconia corundum, and which constitute a new class of products of high hardness which can be used both for their abrasive properties and for their wear-resistance.

If the $Al_2O_3$-$Al_4C_3$ diagram, as published by FOSTER et al in J. Am. Ceram. Soc. (1956) 39, No. 1, 1–11 and reproduced in "Phase Diagrams for Ceramists", volume I (1964), No. 1914, page 524, is considered, it can be seen that there are two aluminium oxycarbides defined: $Al_2OC$ and $Al_4O_4C$. In practice, only the left-hand portion of this diagram, corresponding to compositions not containing $Al_4C_3$, is of interest in the present case as it is known that this carbide decomposes gradually in moist air, giving hydrates of alumina and methane.

Figure 2:
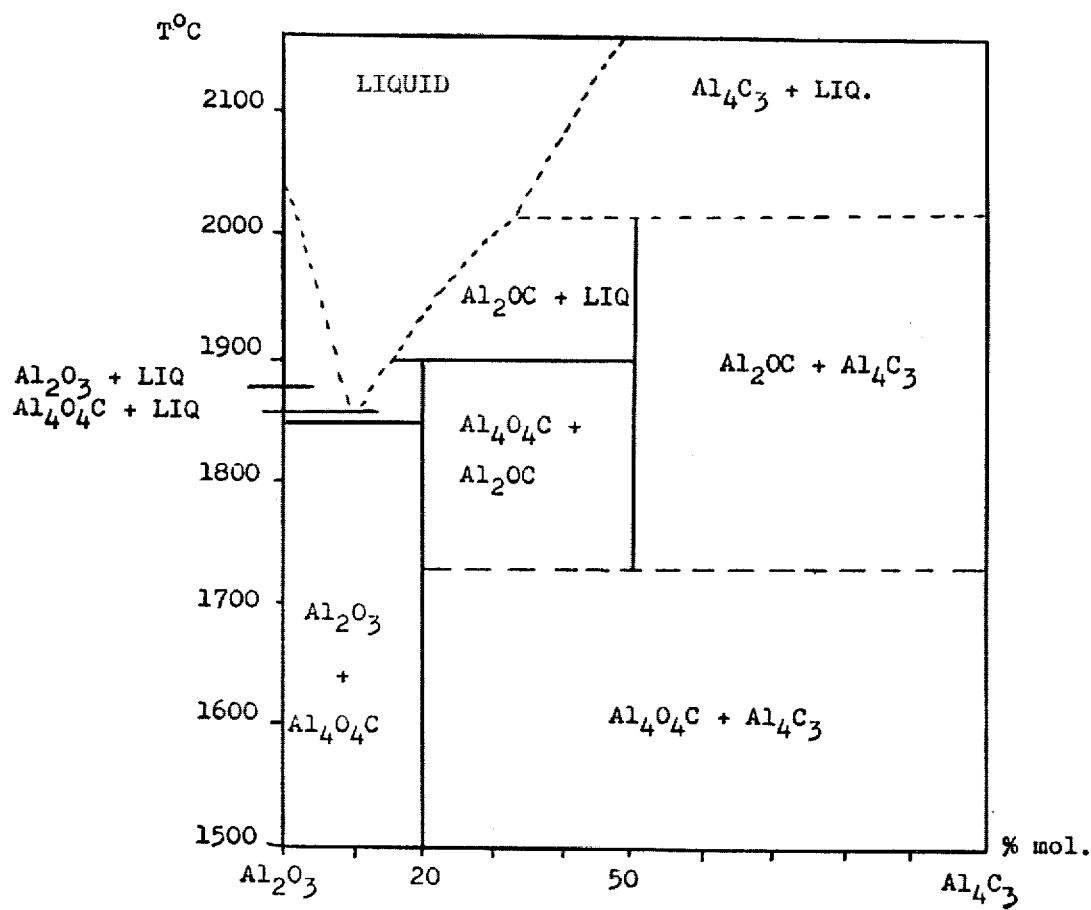

The applicants have found, on the one hand, that the $Al_4O_4C$ oxycarbide was stable whereas the $Al_2OC$ oxycarbide was stable only at high temperature but could be obtained in the metastable state by rapid cooling of the initial liquid mixture $Al_2O_3$-$Al_4C_3$ and, on the other hand, that there was a eutectic $Al_2O_3$-$Al_2OC$ corresponding to 13 molecules % of $Al_4C_3$, the melting point of which is about 1800° C., whereas the diagram of FIG. 2 only reveals the single stable eutectic $Al_2O_3$-$Al_4O_4C$, corresponding to 10 molecules % of $Al_4C_3$, the melting point of which is about 1840° C.

To avoid any confusion in the composition of the products forming the subject of the invention, each product will be characterised by its ratio of the number of carbon atoms to the number of carbon atoms+oxygen atoms, that is to say: C/C+O, which will be designated by $\rho$.

According to this definition, the compounds are:

$Al_2O_3$: $\rho=0$
$Al_4O_4C$: $\rho=0.2$
$Al_2OC$: $\rho=0.5$
$Al_4C_3$: $\rho=1$ It is observed that this ratio $\rho$ is numerically equal to the molar fraction of $Al_4C_3$ in the $Al_2O_3$/$Al_4C_3$ diagram.

As the abrasive products of high hardness forming the subject of the invention can contain, in addition to alumina one and/or other of or both oxycarbides, they can be divided into seven categories:

A—the products constitued by a stable combination of $Al_2O_3$-$Al_4O_4C$:
 1—hypoeutectic, formed by a dispersion of primary alumina crystals in the eutectic matrix $Al_2O_3$-$Al_4O_4C$ with $\rho$ between 0.01 and 0.10,
 2—eutectic, with $\rho$ substantially equal to 0.10,
 3—hypereutectic, constituted by a dispersion of $Al_4O_4C$ particles in a eutectic matrix $Al_2O_3$-$Al_4O_4C$ with $\rho$ between 0.10 and 0.20.

B—the products constituted by a metastable combination of $Al_2O_3$-$Al_2OC$:
 4—hypoeutectic formed by a dispersion of primary alumina crystals in a eutectic matrix of $Al_2O_3$-$Al_2OC$ with $\rho$ between 0.01 and 0.13,
 5—eutectic, with $\rho$ substantially equal to 0.13,
 6—hypereutectic, constituted by a dispersion of $Al_2OC$ particles in a eutectic matrix $Al_2O_3$-$Al_2OC$ with $\rho$ between 0.13 and 0.50.

7—the products constituted by a ternary combination $Al_2O_3$-$Al_2OC$-$Al_4O_4C$ for which $\rho$ can vary between 0.20 and 0.50.

In the various cases, the alumina content is limited:
(a) with regard to low contents, by the need to have an adequate proportion of eutectic to ensure the bonding of the primary alumina particles. This limit corresponds approximately to $\rho=0.01$,
(b) with regard to the high contents, by the need to avoid the presence of $Al_4C_3$ which is unstable in moist air and which appears, with regard to the stable states, beyond $\rho=0.20$ and, with regard to the metastable states, beyond $\rho=0.50$.

In practice, however, the compositions corresponding to $\rho$ between 0.02 and 0.20 have been found to be of most interest.

The applicants have also discovered, and this is another subject of the invention, that the high-hardness abrasive compositions which have just been described could be obtained by fusion of alumina and a carbonaceous substance and cooling at a controlled speed.

The carbonaceous substance can be carbon itself in one of its conventional forms, for example graphite, coke, lamp black, amorphous carbon, or a compound such as aluminium carbide $Al_4C_3$, or even a mixture of aluminium and carbon.

The proportions of the initial constituents are calculated on the basis of the stoichiometric equations as a function of the desired composition. Examples will be given to illustrate the implementation of this process. Although volatilisation of $Al_2OC$ can be observed during the fusing operation, only very slight discrepancies are observed between the calculated compositions and the obtained compositions. Depending on the type of furnace in which fusing is carried out, it may be desirable to operate under a dry inert gas atmosphere so as to avoid any risk of the formation of aluminium nitrides or carbonitrides, but it is also possible to operate in the open air.

The speed of cooling is the essential element which determines the structure of the product. Slow cooling of, for example, from 10° to 20° C. per minute or fast cooling followed by prolonged annealing, for example for 24 hours at 1500° C., or for 15 minutes at 1810° C. leads to the stable structure, that is to say the structure mainly containing the $Al_2O_3$ and $Al_4O_4C$ compounds.

Fast cooling of the order of from 50° to 100° C. per minute or faster leads to the metastable structure, that is to say the structure mainly containing the $Al_2O_3$ and $Al_2OC$ compounds.

For intermediate cooling speeds, a material having a complex ternary structure containing the compounds $Al_2O_3$, $Al_2OC$ and $Al_4O_4C$ can also be obtained.

Even higher speeds, obtained, for example, by casting the liquid into or over large metallic masses in a known manner (cooled solid ingot mould, piling up of metal pellets) also lead to the metastable structure with a finer crystallisation.

The following examples illustrate in a non-limiting manner the conditions for carrying out the invention. They are complied in Table 1.

Examples 1 to 6 need no special comments; examples 7 and 8 demonstrate that a metastable structure obtained by fast cooling is brought to the stable state by annealing for 15 minutes at 1810° C.

A series of tests was then carried out to determine the properties of the abrasive compositions of high hardness forming the subject of the invention.

The machine and method described, in principle, by C. RAGON, L. BELON and H. FORESTIER in "Revue de Métallurgie" Paris, June 1969" pages 471 to 476 and by J. L. BELON, C. RAGON and H. FORESTIER in "Mémoires scientifiques de la Revue de Métallurgie" No. 1, 1973, pages 55 to 59 were used for this evaluation.

The method adopted is as follows: for a given metal, the quantity removed from a cylinder constituted of this metal by a tool formed by a three-faced pyramid, making an angle of 120° and cut from the abrasive to be investigated was measured.

The cylinder of metal is fixed on the periphery of a mandrel rotating at a circumferential speed of the order of 30 m/s. During each revolution of the mandrel, the cylinder passes before the point of the tool under investigation which traces a groove in it. The tool travels along a generatrix of the cylinder and shapes a serie of grooves with controlled lapping over its entire length of 6 cm.

After each test, the quantity of metal removed and the degree of wear of the tool are measured by weighing.

At the beginning of the test the pyramid-shaped tool has a point which is transformed into a flat triangular surface as the pyramid wears away. The wear of the tool is expressed by the area of this flat triangular face.

At the beginning of the test, this surface is reduced at the point of the pyramid whose surface area is of the order of from 0.005 to 0.01 mm². The conditions are similar to those of truing grinding work (fine-particled grinding machines). Towards the end of the test, the surface created can be as much as 2 mm². These are conditions close to trimming grinding work (coarse-particled grinding machines).

In this test, the work of the particles investigated is characterised by the quantity of metal removed by a tool between two consecutive values of the triangular surface area formed by wear.

To illustrate further the results of these tests and to simplify comparison between various abrasives, it is possible:

- on the one hand, to draw a graph by plotting as abscisse the surface area S of the triangular face worn by the tool in square millimeters and, as ordinates, the cumulative total volume V of metal removed, in cubic millimeters.

For each test and for each type of metal, it is possible to draw a characteristic curve $V = f(S)$ which can be assimilated, in practice, to a straight line having an angular coefficient which is greater, the higher the performance of the abrasive.

- on the other hand, to retain the angular coefficient of each curve as "coefficient of quality" λ of the abrasive, used under given conditions, this coefficient being a ratio of the volume to the surface and expressed in millimeters.

FIG. 1 shows a number of curves relating to tools made of sintered bauxite, zirconia corundum and based on compositions according to the invention; and FIG. 2 is a diagram of stable equilibrium, $Al_2O_3$-$Al_4C_3$, according to Foster et al.

With regard to the eight products corresponding to the examples in Table I, Table 2 indicates:

TABLE 1

| Examples | Initial Fused Mixture | | | Temperature reached during fusing (°C.) | Speed of cooling in °C./mn | Possible annealing | Structure observed |
|---|---|---|---|---|---|---|---|
| | | Mol % | P desired | Weight % | | | |
| 1 | $Al_2O_3$ | 95 | 0.05 | 93.1 | 1970° C. | 15 | — | Dispersion of primary $Al_2O_3$ in eutectic matrix $Al_2O_3$—$Al_4O_4C$ |
| | $Al_4C_3$ | 5 | | 6.9 | | | | |
| 2 | $Al_2O_3$ | 90 | 0.10 | 86.4 | 1910 | 15 | — | Characteristic of a eutectic ($Al_2O_3$—$Al_4O_4C$) |
| | $Al_4C_3$ | 10 | | 13.6 | | | | |
| 3 | $Al_2O_3$ | 80 | 0.20 | 73.9 | 1920 | 15 | — | Particles of $Al_4O_4C$ in eutectic matrix $Al_2O_3$—$Al_4O_4C$ |
| | $Al_4C_3$ | 20 | | 26.1 | | | | |
| 4 | $Al_2O_3$ | 90 | 0.10 | 86.4 | 1950 | 70 | — | Dispersion of primary $Al_2O_3$ in eutectic matrix $Al_2O_3$—$Al_2OC$ |
| | $Al_4C_3$ | 10 | | 13.6 | | | | |
| 5 | $Al_2O_3$ | 87 | 0.13 | 82.6 | 1950 | 70 | — | Characteristic of a eutectic ($Al_2O_3$—$Al_2OC$) |
| | $Al_4C_3$ | 13 | | 17.4 | | | | |
| 6 | $Al_2O_3$ | 80 | 0.20 | 73.9 | 1950 | 70 | — | Particles of $Al_2OC$ in eutectic matrix $Al_2O_3$—$Al_2OC$ |
| | $Al_4C_3$ | 20 | | 26.1 | | | | |
| 7 | $Al_2O_3$ | 92 | 0.08 | 89.1 | 1950 | 70 | 15 mn at 1810° C. | Primary alumina in coalesced eutectic $Al_2O_3$—$Al_4O_4C$ |
| | $Al_4C_3$ | 8 | | 10.9 | | | | |
| 8 | $Al_2O_3$ | 80 | 0.20 | 73.9 | 1950 | 70 | 15 mn at 1810° C. | $Al_4O_4C$ particles in coalesced eutectic $Al_2O_3$—$Al_4O_4C$ |
| | $Al_4C_3$ | 20 | | 26.1 | | | | | the KNOOP hardness under a load of 4 daN applied for 20 seconds (hardness expressed in daN/mm²-column 1), the coefficient of quality "λ" of the eight products tested on the one hand on an untreated XC38 carbon steel (column 2) and, on the other hand, on a Z10 CF 17 ferritic stainless steel (column 3).

| Compositions: | |
|---|---|
| XC 38 | C 0.35/0.40%<br>Mn 0.50/0.80%<br>Si 0.10/0.40% |
| Z10 CF 17 | C <0.12%<br>Mn <1.5%<br>Si <1.0%<br>Cr <16 to 18%<br>Ni <0.5% |

In FIG. 1, the curve corresponds to the following abrasives, used for removal of metal on a XC 38 steel:
Curve 1: sintered bauxite (λ=6 mm)
Curve 2: zirconia corundum (λ=8 mm)
Curve 3: abrasive according to the invention, Table 1 No. 3 (λ=1130 mm)
Curve 4: abrasive according to the invention, Table 1 No. 6 (λ=2080 mm)
Curve 5: abrasive according to the invention, Table 1 No. 4 (λ=6200 mm)

TABLE 2

| Reference Abrasive Product (Table 1) | | (1) KNOOP hardness daN/mm² | (2) Coefficient of quality in abrasion λ (mm) XC 38 | (3) Coefficient of quality in abrasion λ (mm) Z10 CF 17 |
|---|---|---|---|---|
| Hypoeutectic | (1) | 1140 | 1060 | 340 |
|  | (2) stable | 1130 | 1300 | 560 |
| Hyper | (3) | 900 | 1130 | 650 |
| Hypoeutectic | (4) meta- | 1280 | 6200 | 3800 |
|  | (5) stable | 1250 | 1740 | 510 |
| Hyper | (6) | 1220 | 2080 | 420 |
|  | (7) meta-stable | 1020 | 1610 | 550 |
|  | (8) annealed | 950 | 1520 | 410 |
| Sintered Bauxite | | 740 | 6 | 30 |
| Zirconia Corundum | | 1350 | 800 | 250 |

The superiority of the compositions forming the subject of the invention relative to the conventional abrasives and, in particular, composition No. 4 whose characteristics are quite exceptional and leave the best abrasives used at present far behind can be observed.

It should also be noted that the so-called "metastable" abrasive compositions have total stability, even in the most severe operating conditions, and that the transformation of the metastable structure into a stable structure is only produced by keeping it at temperatures higher than 1500° C. for a prolonged period.

These new high-hardness compositions are suitable as abrasives both for coarse burring work and for fine grinding and remedial work. In all cases, the quantities of metal removed by the tool are much better than those removed by the other abrasives if they are related to the same quantity of consumed abrasive.

They can be used in all the known forms and for all the applications exploiting their high hardness and/or their abrasive capacity. Let us quote as non-limiting examples:

agglomerated abrasives for cutting discs, truing or trimming grinding machines,
abrasives used for machining or polishing cloths and papers,
powders for grinding and sawing,
fragments for mechanical surface finishing work such as shot-blasting or tunnelling,
solid parts or loose parts which have to resist wear such as dies and draw plates, wire guides, cutting plates.

In these cases, the parts can be obtained in a mould by casting liquid into cooled moulds.

The possible applications thus include metal transformation and machining operations as well as operations involving mineral materials (drilling, sawing of rocks, for example), or even industries involved in the construction of equipment subjected to significant wear.

We claim:

1. A high-hardness abrasive product, characterised in that it is constituted by the combination of crystalline phases of alumina and of at least one of the two aluminium oxycarbides $Al_2OC$ and $Al_4O_4C$, in which the ratio $\rho$ of the number of carbon atoms to the number of carbon atoms plus oxygen atoms (C/C+O) is between 0.01 and 0.50.

2. A high-hardness abrasive product, according to claim 1, characterised in that the ratio $\rho$ is preferably between 0.02 and 0.20.

3. A high-hardness abrasive product, according to claim 1 or 2, characterised in that it is constituted by a dispersion of primary alumina crystals in a eutectic matrix ($Al_2O_3$-$Al_4O_4C$) with a ratio $\rho$ of between 0.01 and 0.1.

4. A high-hardness abrasive product, according to claim 1 or 2, characterised in that it is constituted by the eutectic $Al_2O_3$-$Al_4O_4C$ with a ratio $\rho$ substantially equal to 0.10.

5. A high-hardness abrasive product, according to claim 1 or 2, characterised in that it is constituted by a dispersion of $Al_4O_4C$ particles in a eutectic matrix $Al_2O_3$-$Al_4O_4C$ with a ratio $\rho$ of between 0.10 and 0.20.

6. A high-hardness abrasive product, according to claim 1 or 2, characterised in that it is constituted by a dispersion of primary alumina crystals in a eutectic matrix $Al_2O_3$-$Al_2OC$ with a ratio $\rho$ between 0.01 and 0.13.

7. A high-hardness abrasive product, according to claim 1 or 2, characterised in that it is constituted by the eutectic $Al_2O_3$-$Al_2OC$ with a ratio $\rho$ substantially equal to 0.13.

8. A high-hardness abrasive product, according to claim 1 or 2, characterised in that it is constituted by a dispersion of $Al_2OC$ particles in a eutectic matrix $Al_2O_3$-$Al_2OC$ with a ratio $\rho$ of between 0.13 and 0.50, preferably between 0.13 and 0.20.

9. A high-hardness abrasive product, according to claim 1 or 2, characterised by a ternary combination of crystalline phases $Al_2O_3$-$Al_2OC$-$Al_4O_4C$ with a ratio $\rho$ of between 0.02 and 0.50 and preferably between 0.02 and 0.20.

10. A process for the preparation of high-hardness abrasive products comprising the steps of fusing alumina in the presence of a carbonaceous substance to derive a reaction product constituted by alumina and at least one of the two aluminum oxycarbides $Al_2OC$ and $Al_4O_4C$ in which the ratio $\rho$ of the number of carbon atoms to the number of carbon atoms plus oxygen atoms (C/C+O) is between 0.01 and 0.50 and cooling the the reaction product to a solid at a controlled, predetermined rate.

11. A process for the preparation of high-hardness abrasive products according to claim 10, characterised in that the carbonaceous substance is selected from the group comprising graphite, coke, lamp black, amorphous carbon aluminum carbide and a mixture of carbon and aluminum.

12. A process for the preparation of high-hardness abrasive products according to claim 10, characterised in that the carbonaceous substance is aluminium carbide $Al_4C_3$.

13. A process for the preparation of high-hardness abrasive products according to claim 10, characterised in that the carbonaceous substance is a mixture of carbon and aluminium.

14. A process for the preparation of high-hardness abrasive products according to any one of claims 10 to 13, characterised in that the fusing is carried out under a dry inert gas.

15. A process for the preparation of high-hardness abrasive products according to claim 10, 11, 12 or 13, characterized in that the fusing and at least the beginning of the cooling are carried out under dry inert gas.

16. A process for the preparation of high-hardness abrasive products according to claim 10, 11, 12 or 15, characterised in that the reaction product is cooled at a high rate by casting over a plurality of metallic masses or into a large metallic mould.

* * * * *